(12) United States Patent
Wang et al.

(10) Patent No.: US 12,422,679 B2
(45) Date of Patent: Sep. 23, 2025

(54) NEAR-EYE DISPLAY DEVICE AND MANUFACTURING METHOD OF THE SAME

(71) Applicant: AUO Corporation, Hsinchu (TW)

(72) Inventors: Wei-Syun Wang, Hsinchu (TW);
Hsin-Hung Li, Hsinchu (TW);
Chih-Chiang Chen, Hsinchu (TW);
Yu-Cheng Shih, Hsinchu (TW);
Chia-Hsin Chung, Hsinchu (TW);
Cheng-Chan Wang, Hsinchu (TW);
Ming-Jui Wang, Hsinchu (TW);
Han-Sheng Nian, Hsinchu (TW)

(73) Assignee: AUO Corporation, Hsinchu (TW)

( * ) Notice: Subject to any disclaimer, the term of this patent is extended or adjusted under 35 U.S.C. 154(b) by 390 days.

(21) Appl. No.: 18/314,835

(22) Filed: May 10, 2023

(65) Prior Publication Data

US 2024/0053610 A1    Feb. 15, 2024

(30) Foreign Application Priority Data

Aug. 11, 2022   (TW) .................................. 111130144

(51) Int. Cl.
*G02B 27/00*   (2006.01)
*G02B 6/12*    (2006.01)
(Continued)

(52) U.S. Cl.
CPC ..... *G02B 27/0172* (2013.01); *G02B 6/12016* (2013.01); *G02B 6/122* (2013.01);
(Continued)

(58) Field of Classification Search
CPC .......................... G02B 27/01; G02B 27/0101; G02B 27/0103; G02B 27/0149; G02B 27/017;
(Continued)

(56) References Cited

U.S. PATENT DOCUMENTS

| | | | |
|---|---|---|---|
| 11,860,400 B2 * | 1/2024 | Wang | G02F 1/133617 |
| 2022/0231006 A1 | 7/2022 | Diao et al. | |
| 2023/0236351 A1 * | 7/2023 | Shi | G02B 6/0035 349/65 |

FOREIGN PATENT DOCUMENTS

| | | |
|---|---|---|
| CN | 111969001 | 11/2020 |
| CN | 112014978 | 12/2020 |

(Continued)

*Primary Examiner* — Henry Duong
(74) *Attorney, Agent, or Firm* — JCIPRNET

(57) ABSTRACT

A near-eye display device, including a substrate, a light-emitting element, an active element, an optical layer, and a light guide structure, is provided. The light-emitting element is located on the substrate and includes a first type semiconductor pattern. The active element is located adjacent to the light-emitting element. A channel layer of the active element and the first type semiconductor pattern of the light-emitting element belong to the same layer. The optical layer covers the light-emitting element and the active element. The light guide structure is located on the optical layer and includes an in-coupling portion and an out-coupling portion, wherein an orthogonal projection of the in-coupling portion on the substrate is overlapped with an orthogonal projection of the light-emitting element on the substrate. A manufacturing method of the near-eye display device is also provided.

15 Claims, 18 Drawing Sheets

(51) Int. Cl.
    *G02B 6/122*    (2006.01)
    *G02B 27/01*    (2006.01)
    *G02B 27/30*    (2006.01)

(52) U.S. Cl.
    CPC ...... *G02B 27/30* (2013.01); *G02B 2027/0178* (2013.01); *G02B 2207/101* (2013.01)

(58) Field of Classification Search
    CPC ............ G02B 27/0172; G02B 27/0176; G02B 27/0179; G02B 27/0189; G02B 2027/0105; G02B 2027/0107; G02B 2027/0109; G02B 2027/011; G02B 2027/0112; G02B 2027/0114; G02B 2027/0116; G02B 2027/0118; G02B 2027/012; G02B 2027/0121; G02B 2027/0123; G02B 2027/0125; G02B 2027/0127; G02B 2027/0129; G02B 2027/013; G02B 2027/0132; G02B 2027/0134; G02B 2027/0136; G02B 2027/0138; G02B 2027/014; G02B 2027/0141; G02B 2027/0143; G02B 2027/0145; G02B 2027/0147; G02B 2027/015; G02B 2027/0152; G02B 2027/0154; G02B 2027/0156; G02B 2027/0158; G02B 2027/0159; G02B 2027/0161; G02B 2027/0163; G02B 2027/0165; G02B 2027/0167; G02B 2027/0169; G02B 2027/0174; G02B 2027/0178; G02B 2027/0181; G02B 2027/0183; G02B 2027/0185; G02B 2027/0187; G02B 2027/019; G02B 2027/0192; G02B 2027/0194; G02B 2027/0196; G02B 2027/0198; G02B 6/12016; G02B 6/122; G02B 27/30; G02B 2207/101; G09F 9/33; H10H 29/142
    USPC ........................................................ 359/630
    See application file for complete search history.

(56) References Cited

FOREIGN PATENT DOCUMENTS

| | | |
|---|---|---|
| CN | 212781502 | 3/2021 |
| CN | 112701200 | 4/2021 |
| WO | 2020150276 | 7/2020 |

\* cited by examiner

NEAR-EYE DISPLAY DEVICE AND MANUFACTURING METHOD OF THE SAME

CROSS-REFERENCE TO RELATED APPLICATION

This application claims the priority benefit of Taiwan application serial no. 111130144, filed on Aug. 11, 2022. The entirety of the above-mentioned patent application is hereby incorporated by reference herein and made a part of this specification.

BACKGROUND

Technical Field

This disclosure relates to a display device and a manufacturing method of the same, and particularly to a near-eye display device and a manufacturing method of the same.

Description of Related Art

Near-eye displays are mainly composed of micro displays and optical elements. The micro display, such as a self-luminous micro organic light-emitting diode (micro OLED) and a micro light-emitting diode (micro LED) display, or liquid crystal on silicon (LCOS), digital light processing (DLP), and laser beam scanning (LBS) that require an external light source, provides a display image. The optical element, such as a light guide, is used to transmit image light.

However, currently, the micro display in the near-eye display is an external display. In addition to the increased difficulty in assembly due to the need to align the in-coupling of the light guide, the longer transmission distance of the image of the micro display also causes more severe light loss.

SUMMARY

The disclosure provides a near-eye display device, which can reduce light loss.

The disclosure provides a manufacturing method of a near-eye display device, which can reduce the difficulty of assembly.

An embodiment of the disclosure provides a near-eye display device. The near-eye display device includes a substrate, a light-emitting element, an active element, an optical layer, and a light guide structure. The light-emitting element is located on the substrate and includes a first type semiconductor pattern. The active element is located adjacent to the light-emitting element, and a channel layer of the active element and the first type semiconductor pattern of the light-emitting element belong to a same layer. The optical layer covers the light-emitting element and the active element. The light guide structure is located on the optical layer and includes an in-coupling portion and an out-coupling portion. The in-coupling portion is overlapped with the light-emitting element.

An embodiment of the disclosure provides a manufacturing method of a near-eye display device and includes the following steps. A light-emitting element and an active element are formed on a substrate, and a first electrode of the light-emitting element is electrically connected to a drain of the active element. An optical layer is formed on the substrate, and the optical layer covers the light-emitting element and the active element. A light guide structure is formed on the optical layer. The light guide structure includes an in-coupling portion and an out-coupling portion, and the in-coupling portion is overlapped with the light-emitting element.

To make the aforementioned more comprehensible, several embodiments accompanied with drawings are described in detail as follows.

DESCRIPTION OF THE EMBODIMENTS

Figure 1:
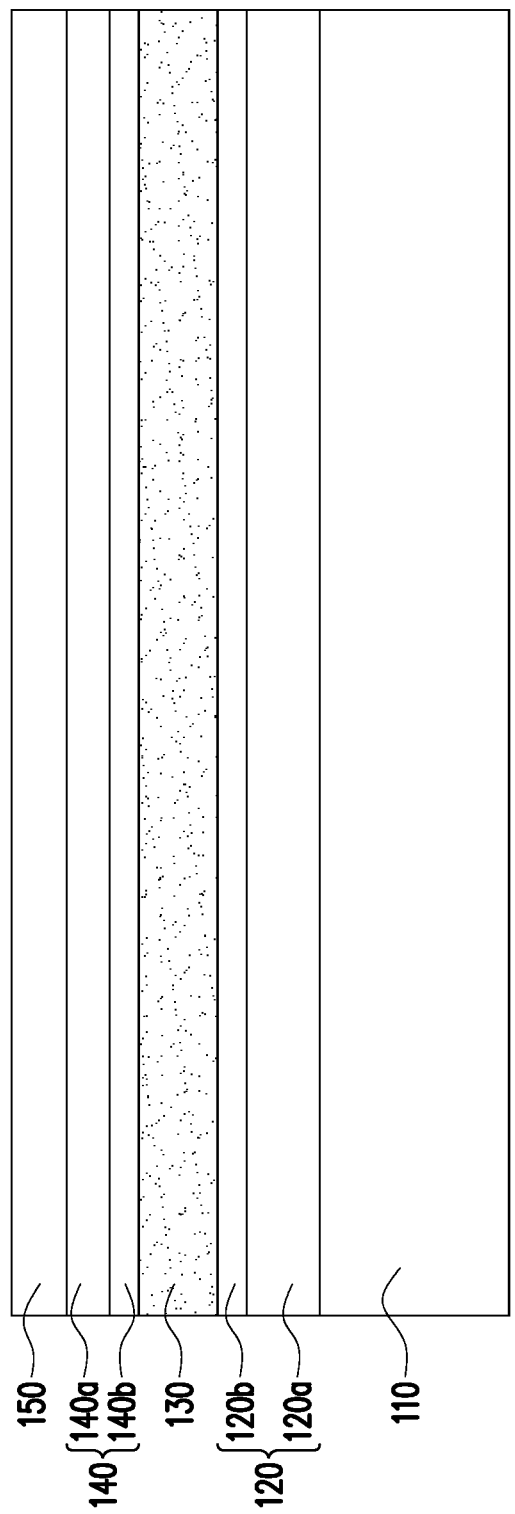
FIGS. 1 to 12 are partial cross-sectional schematic diagrams of a step-by-step process of a manufacturing method of a near-eye display device 10 according to an embodiment of the disclosure.

In the drawings, the thickness of layers, films, panels, regions, etc., is exaggerated for clarity. Throughout the specification, the same reference numerals denote the same elements. It should be understood that when an element such as a layer, a film, a region, or a substrate is referred to as being "on" another element or "connected to" another element, the element may be directly on the another element or connected to the another element, or there may be an intermediate element. In contrast, when an element is referred to as being "directly on" another element or "directly connected to" another element, there is no intermediate element. As used herein, "connection" may refer to physical and/or electrical connection. Furthermore, "electrical connection" or "coupling" may be that there is another element between two elements.

It should be understood that although terms such as "first", "second", and "third" may be used herein to describe various elements, components, regions, layers, and/or parts, the elements, components, regions, layers, and/or parts are not limited by the terms. The terms are only used to distinguish one element, component, region, layer, or part from another element, component, region, layer, or part. Therefore, a first "element", "component", "region", "layer", or "part" discussed below may be referred to as a second element, component, region, layer, or part without departing from the teachings herein.

The terms used herein are only for the purpose of describing specific embodiments and are not limiting. As used herein, unless the content clearly indicates otherwise, the singular forms "a", "one", and "the" are intended to include plural forms, including "at least one" or represents "and/or". As used herein, the term "and/or" includes any and all combinations of one or more of the relevant listed items. It should also be understood that when used in the specification, the terms "containing" and/or "including" designate the presence of the feature, the region, the entirety, the step, the operation, the element, and/or the component, but do not exclude the presence or the addition of one or more other features, regions, entireties, steps, operations, elements, components, and/or combinations thereof.

In addition, relative terms such as "lower" or "bottom" and "upper" or "top" may be used herein to describe the relationship between an element and another element, as shown in the drawings. It should be understood that the relative terms are intended to include different orientations of a device in addition to the orientation shown in the drawings. For example, if the device in a drawing is flipped, an element described as being on the "lower" side of other elements will be oriented on the "upper" side of the other elements. Therefore, the exemplary term "lower" may include the orientations of "lower" and "upper", depending on the specific orientation of the drawing. Similarly, if the device in a drawing is flipped, an element described as being "under" or "below" other elements will be oriented "above" the other elements. Therefore, the exemplary term "under" or "below" may include the orientations of above and below.

Considering the specific quantity of measurements and errors related to the measurements (i.e., limitations of the measurement system) discussed, the terms "approximately", "roughly", or "substantially" used herein include the stated value and the average value within an acceptable range of deviation from a specific value determined by those skilled in the art. For example, "approximately" may indicate within one or more standard deviations of the stated value, or within ±30%, ±20%, ±10%, or ±5%. Additionally, an acceptable range of deviation or standard deviation may be chosen for the terms "approximately", "roughly", or "substantially" used herein according to optical properties, etching properties, or other properties, rather than applying one standard deviation to all properties.

Unless otherwise defined, all terms (including technical and scientific terms) used herein have the same meaning as commonly understood by persons skilled in the art of the disclosure. It will be further understood that terms such as those defined in commonly used dictionaries should be interpreted as having meanings consistent with the meanings in the related art and the context of the disclosure, and will not be interpreted as having idealized or overly formal meanings unless explicitly defined herein.

The exemplary embodiments are described herein with reference to cross-sectional diagrams that are schematic diagrams of idealized embodiments. Therefore, changes in shapes of illustration as a result of, for example, manufacturing technology and/or tolerances may be expected. Therefore, the embodiments described herein should not be interpreted as being limited to the specific shapes of regions as shown herein, but include, for example, shape deviations caused by manufacturing. For example, a region that is shown or described as flat may generally have rough and/or non-linear features. In addition, an acute angle shown may be rounded. Therefore, the regions shown in the drawings are schematic in nature, and the shapes thereof are not intended to show the precise shapes of the regions and are not intended to limit the scope of the claims.

FIGS. 1 to 12 are partial cross-sectional schematic diagrams of a step-by-step process of a manufacturing method of a near-eye display device 10 according to an embodiment of the disclosure. Below, the manufacturing method of the near-eye display device 10 will be explained in combination with FIGS. 1 to 12.

Please refer to FIG. 1. First, a first type semiconductor layer 120, a light-emitting layer 130, a second type semiconductor layer 140, and an insulating layer 150 are sequentially formed on a substrate 110. In this embodiment, the substrate 110 may be a growth substrate for growing epitaxial materials, such as a sapphire substrate. In some embodiments, the first type semiconductor layer 120, the light-emitting layer 130, and the second type semiconductor layer 140 are grown on the substrate 110 by epitaxial growth, and the main materials include gallium nitride (GaN), but may contain different dopants. However, the main materials of these epitaxial layers are not limited thereto. For example, the first type semiconductor layer 120 is an N-type doped semiconductor layer and includes a first sub-layer 120a and a second sub-layer 120b, wherein the first sub-layer 120a is an n-GaN layer and the second sub-layer 120b is an n-AlGaN layer. In addition, the second type semiconductor layer 140 may be a P-type doped semiconductor layer and includes a first sub-layer 140a and a second sub-layer 140b, wherein the first sub-layer 140a is a p-GaN layer and the second sub-layer 140b is a p-AlGaN layer. In some embodiments, the structure of the light-emitting layer 130 is a multiple quantum well (MQW) structure. The multiple quantum well structure includes alternately stacked multiple layers of indium gallium nitride (InGaN) and gallium nitride (GaN). By designing the proportion of indium or gallium in the light-emitting layer 130, the light-emitting wavelength range of the light-emitting layer 130 may be adjusted. The material of the insulating layer 150 may be, for example, silicon dioxide ($SiO_2$), but the disclosure is not limited thereto.

Figure 2:
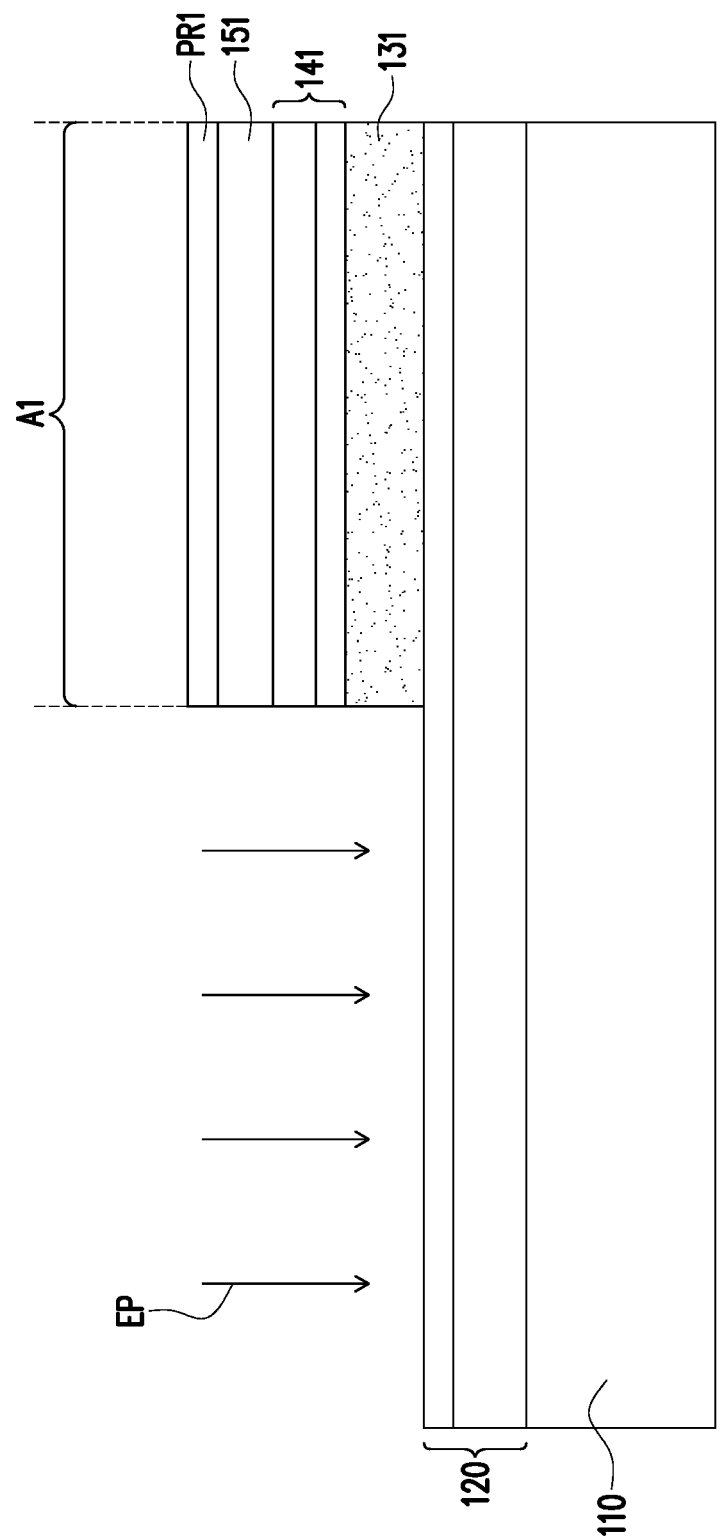
Figure 3:
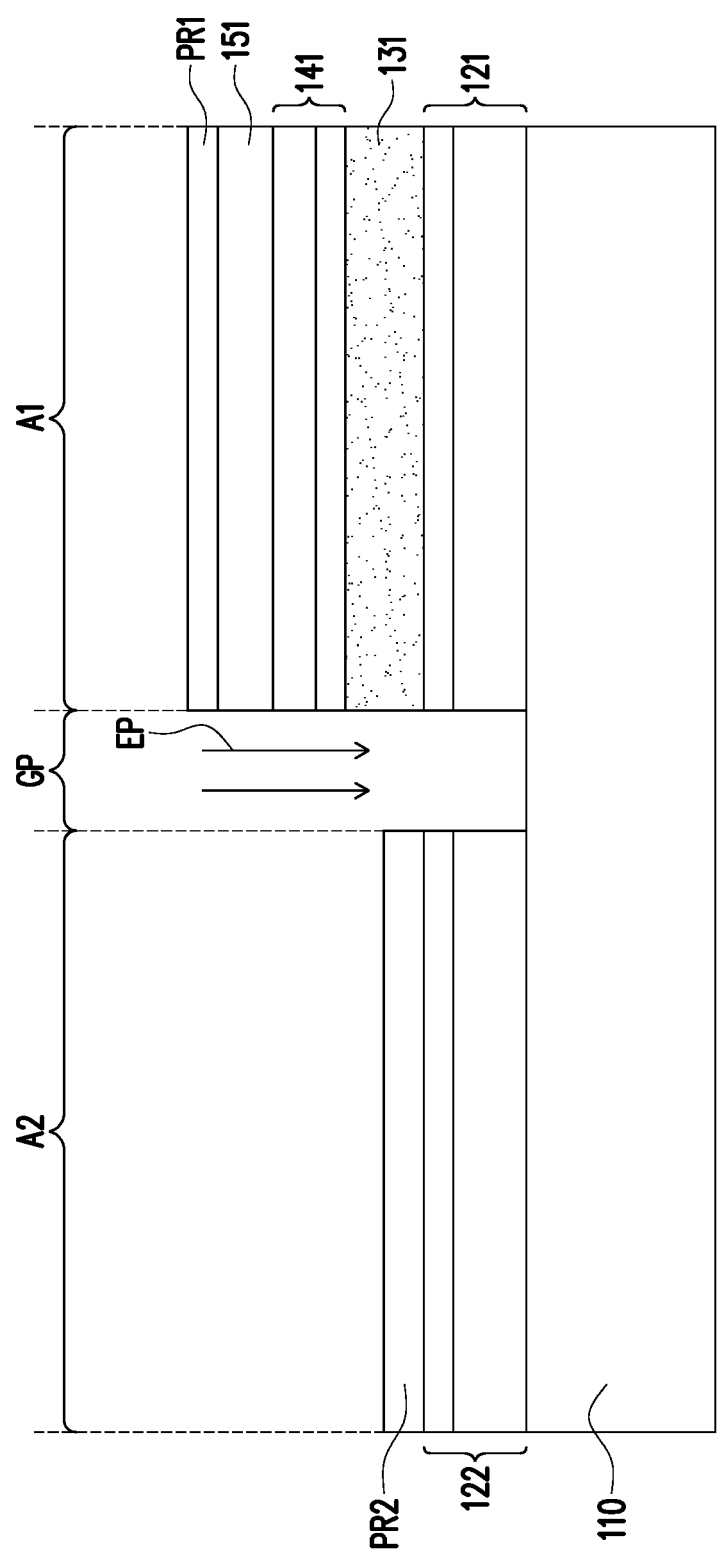

Next, please refer to FIGS. 2 and 3. The insulating layer 150, the second type semiconductor layer 140, the light-emitting layer 130, and the first type semiconductor layer 120 are patterned to form a light-emitting element area A1 and an active element area A2 on the substrate 110. There is a gap GP between the light-emitting element area A1 and the active element area A2. The second type semiconductor layer 140 and the light-emitting layer 130 in the active element area A2 are removed.

For example, please refer to FIG. 2. A patterning process EP may be performed on the insulating layer 150, the second type semiconductor layer 140, and the light-emitting layer 130 using a photoresist PR1 to keep the light-emitting pattern 131, the second type semiconductor pattern 141, and the insulating pattern 151 located in the light-emitting element area A1. The remaining parts of the insulating layer 150, the second type semiconductor layer 140, and the light-emitting layer 130 are removed. Then, please refer to FIG. 3. The patterning process EP using photoresists PR1 and PR2 may be performed to remove the first type semiconductor layer 120 located in the gap GP and to keep the first type semiconductor pattern 121 located in the light-emitting element area A1 and the first type semiconductor pattern 122 located in the active element area A2, so that the gap GP is between the active element area A2 and the light-emitting element area A1, so as to isolate the active element area A2 and the light-emitting element area A1. In some embodiments, the patterning process EP may be performed using a dry etching process, but the disclosure is not limited thereto.

Figure 4:
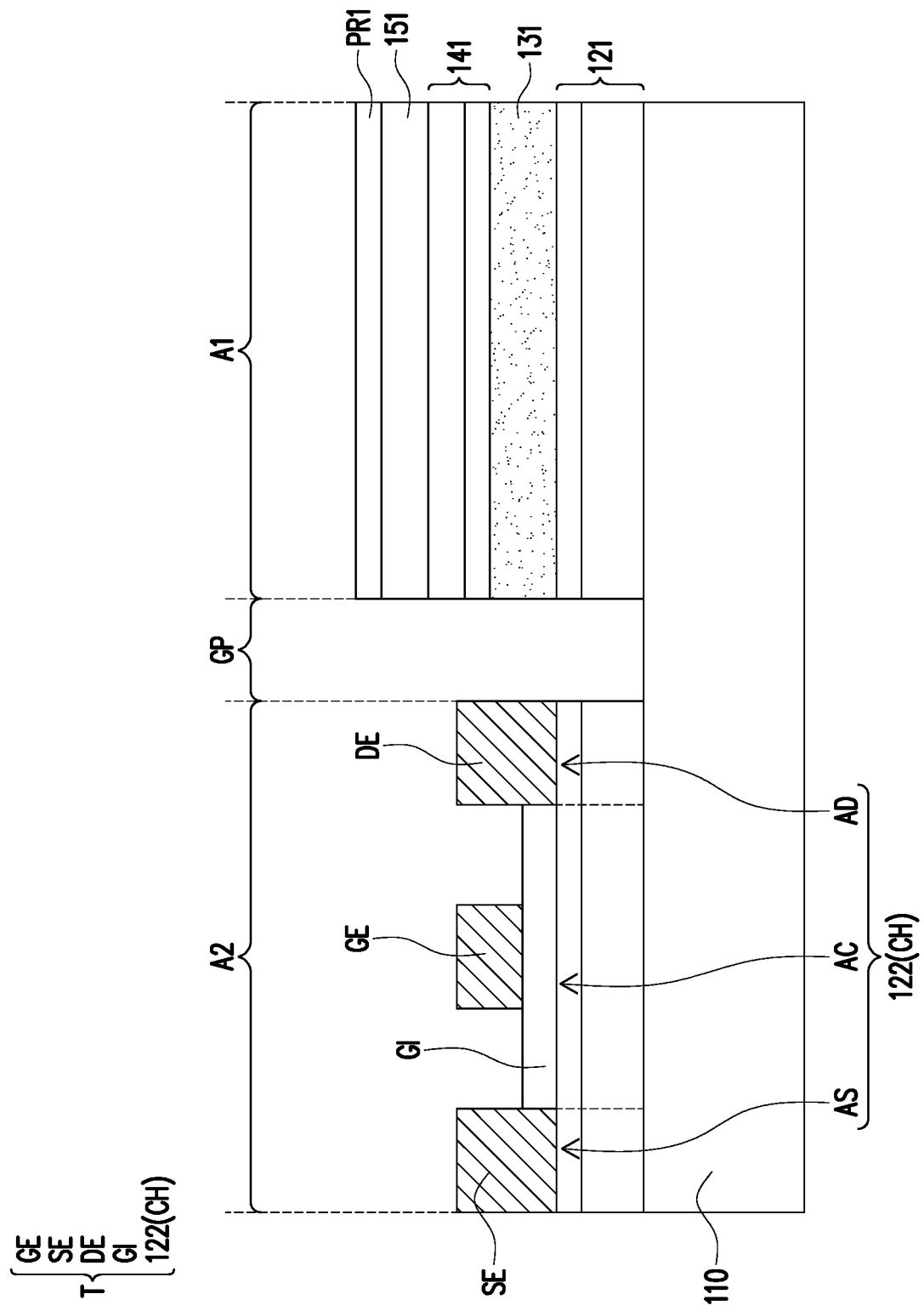

Next, please refer to FIG. 4. The photoresist PR2 may be removed first to expose the first type semiconductor pattern 122 located in the active element area A2. Then, a gate insulating layer GI may be formed on the first type semiconductor pattern 122, and the gate insulating layer GI may partially cover the first type semiconductor pattern 122. For example, the gate insulating layer GI covers an upper surface of a channel area AC of the first type semiconductor pattern 122, and exposes upper surfaces of a source area AS and a drain area AD of the first type semiconductor pattern 122, wherein the channel area AC is located between the source area AS and the drain area AD. The material of the gate insulating layer GI may include metal oxide, but the disclosure is not limited thereto.

Next, a gate GE, a source SE, and a drain DE may be formed, wherein the gate GE is located on the gate insulating layer GI in the active element area A2, and the source SE and the drain DE are respectively located on the upper surfaces of the source area AS and the drain area AD of the first type semiconductor pattern 122, thus forming an active element T. The active element T may include the gate GE, the source SE, the drain DE, the gate insulating layer GI, and the first type semiconductor pattern 122, and the first type semiconductor pattern 122 may serve as a channel layer CH of the active element T. The gate insulating layer GI is located between the gate GE and the first type semiconductor pattern 122, the source SE is electrically connected to the source area AS of the first type semiconductor pattern 122, and the drain DE is electrically connected to the drain area AD of the first type semiconductor pattern 122. The active element T may be a high electron mobility transistor (HEMT), but the disclosure is not limited thereto.

Figure 5:
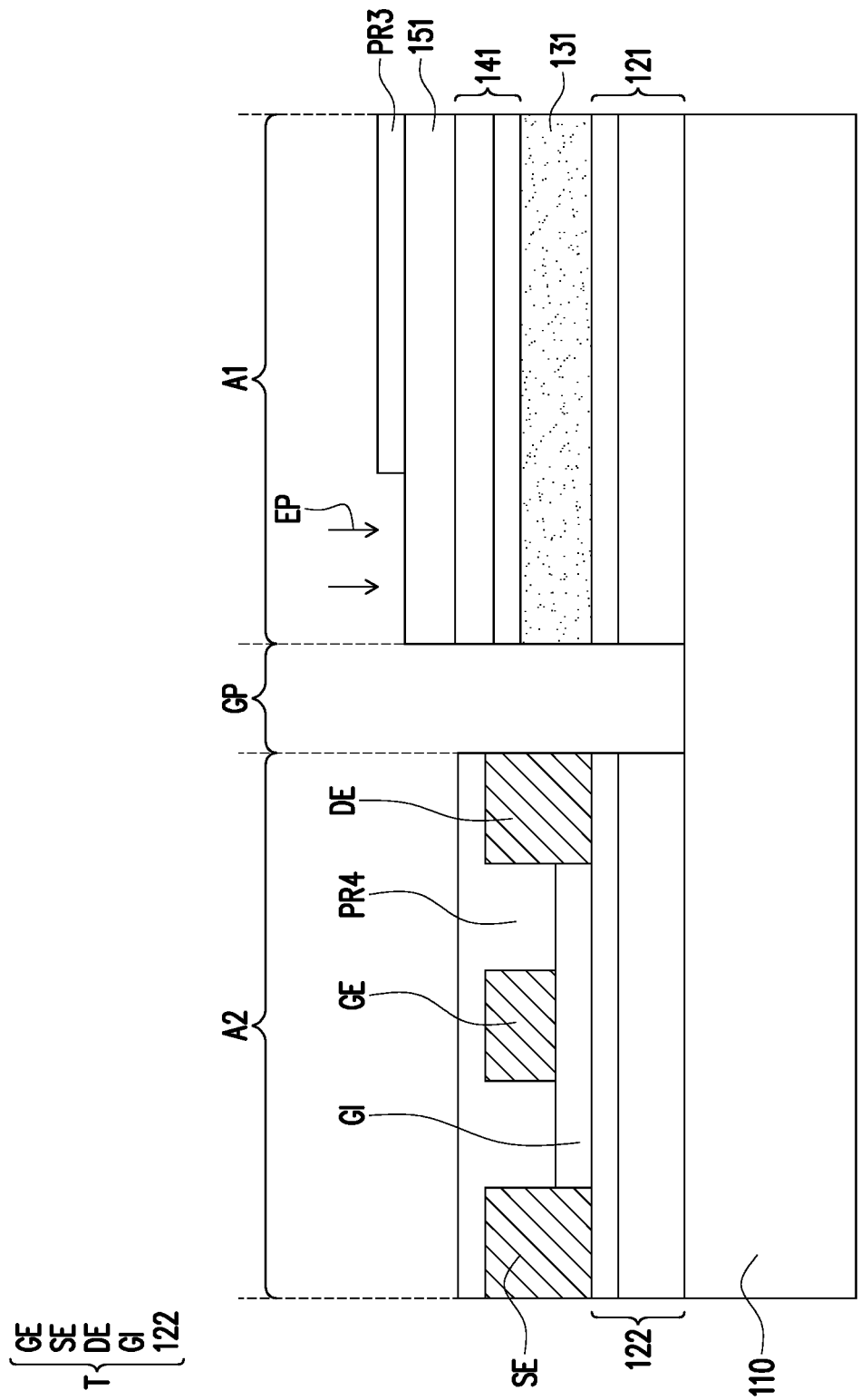
Figure 6:
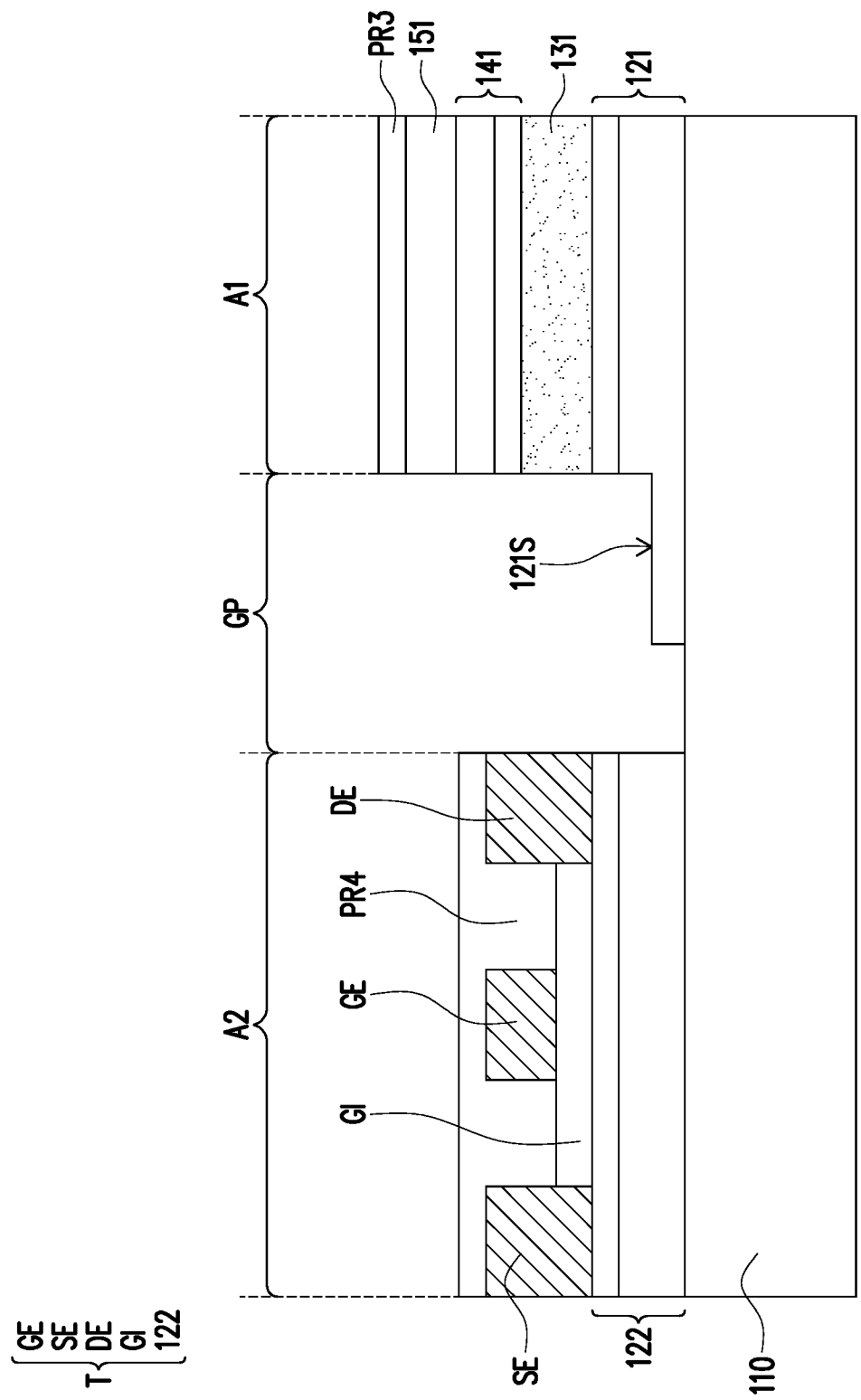

Next, please refer to FIGS. 5 and 6. The patterning process EP is performed on the first type semiconductor pattern 121, the light-emitting pattern 131, the second type semiconductor pattern 141, and the insulating pattern 151 located in the light-emitting element area A1 using a photoresist PR3 to remove a part of the insulating pattern 151, a part of the second type semiconductor pattern 141, a part of the light-emitting pattern 131, and a part of the first type semiconductor pattern 121 that are not covered by the photoresist PR3, and expose a local surface 121S of the first type semiconductor pattern 121 is exposed, while protecting the active element T located in the active element area A2 using a photoresist PR4, as shown in FIG. 6.

Figure 7:
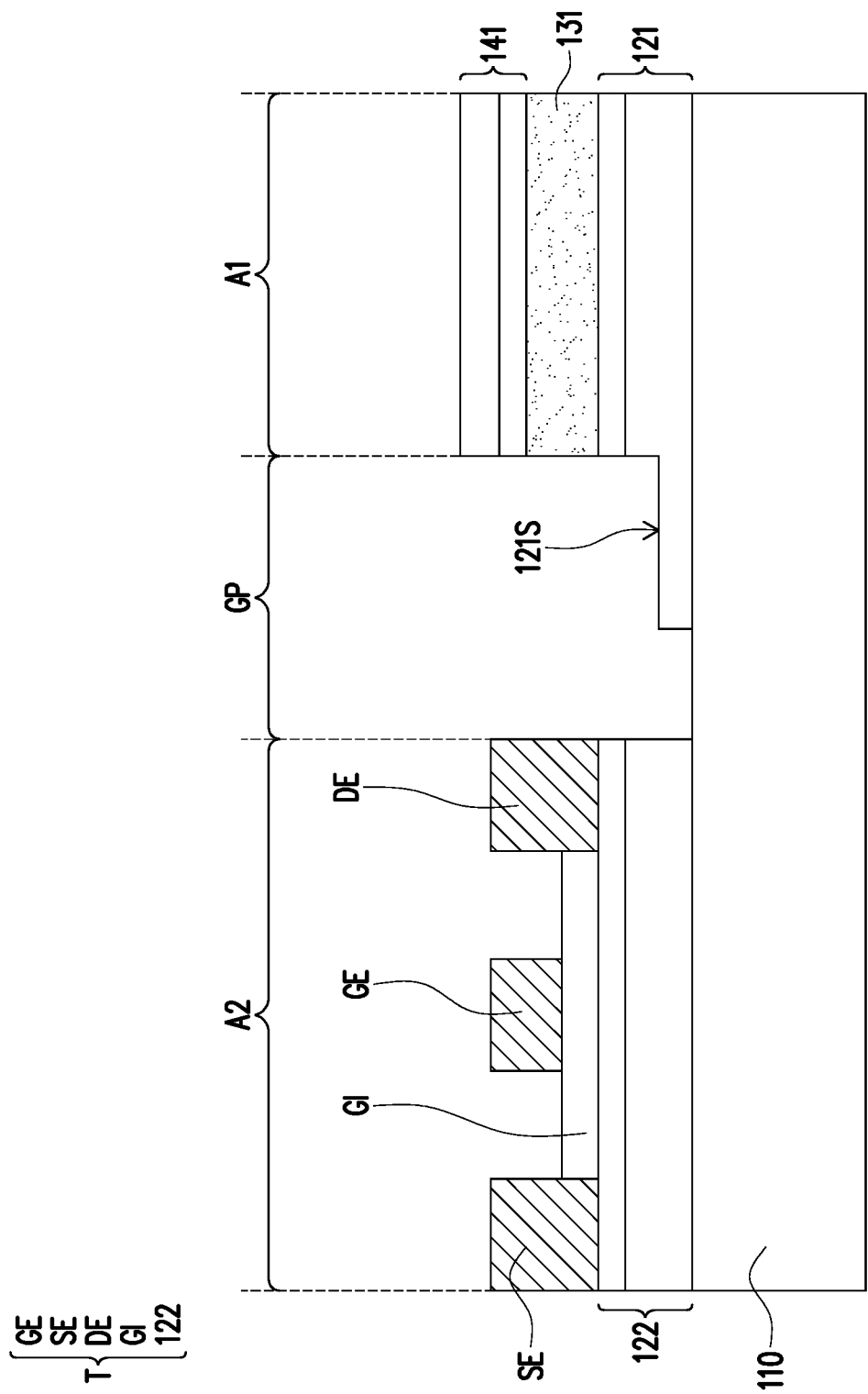
Figure 8:
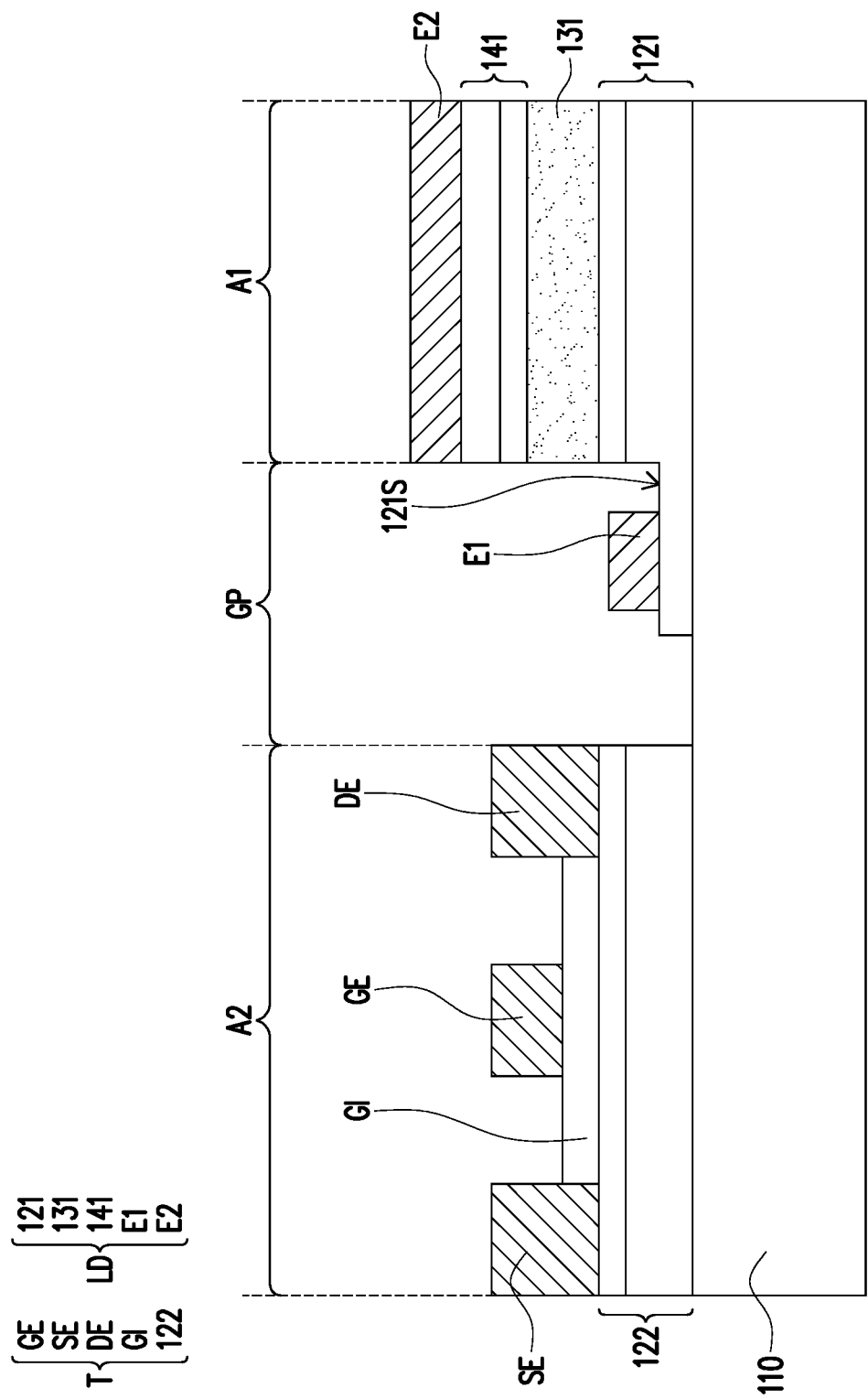

Next, the photoresist PR3 and the remaining insulating pattern 151 may be removed to expose the second type semiconductor pattern 141, and the photoresist PR4 may be removed to expose the gate GE, the source SE, the drain DE, and a part of the gate insulating layer GI of the active element T, as shown in FIG. 7. Then, please refer to FIG. 8. A first electrode E1 may be formed on the local surface 121S of the first type semiconductor pattern 121, and a second electrode E2 may be formed on the second type semiconductor pattern 141, so that the first electrode E1 may be electrically connected to the first type semiconductor pattern 121, and the second electrode E2 may be electrically connected to the second type semiconductor pattern 141, thereby completing the manufacturing of a light-emitting element LD. The light-emitting element LD may include the remaining first type semiconductor pattern 121, light-emitting pattern 131, and second type semiconductor pattern 141, the first electrode E1, and the second electrode E2. The first type semiconductor pattern 121 of the light-emitting element LD and the channel layer CH of the active element T belong to the same layer.

Figure 9:
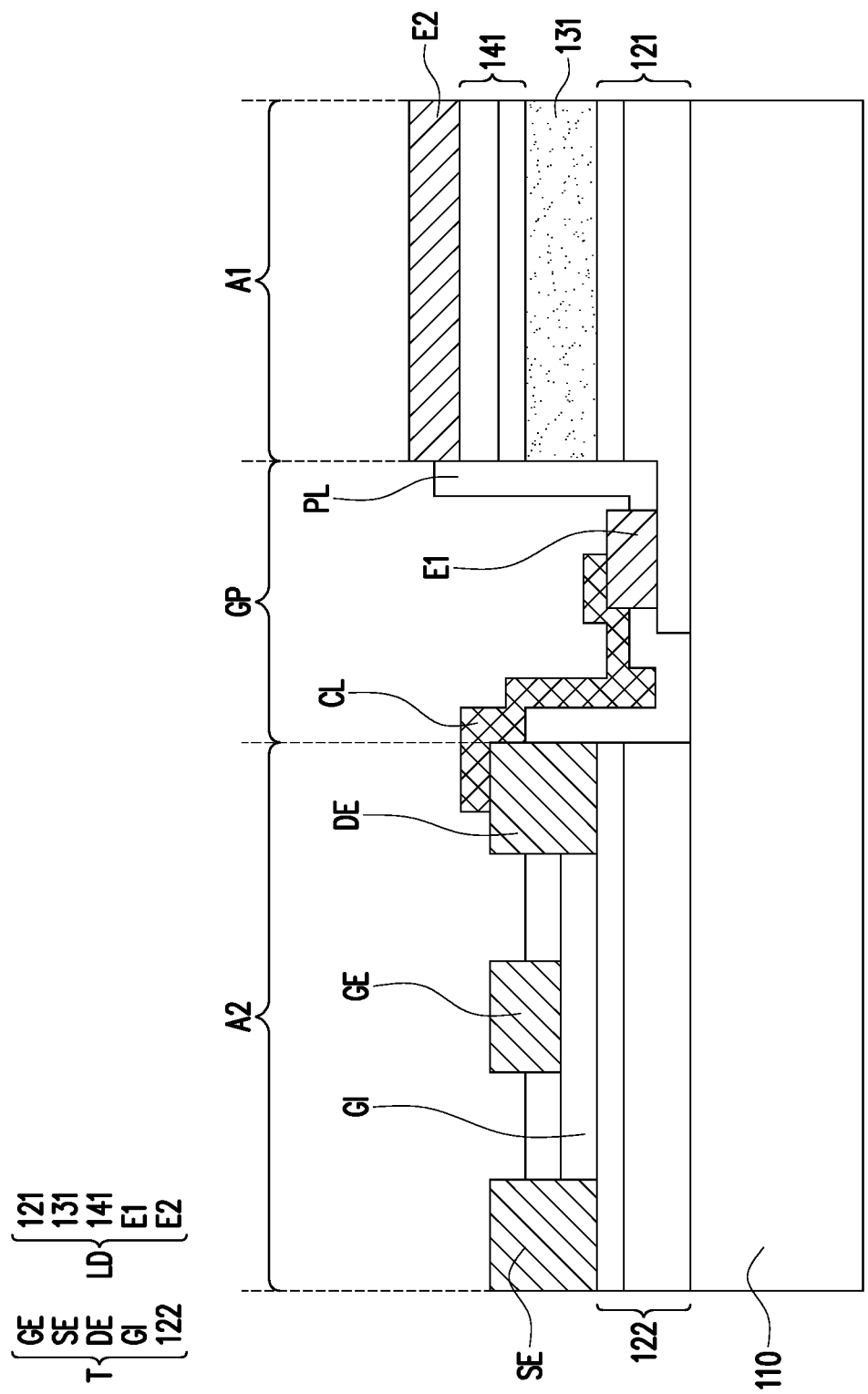

Next, please refer to FIG. 9. A protective layer PL is formed in the light-emitting element area A1, the active element area A2, and the gap GP. The first electrode E1 and the second electrode E2 of the light-emitting element LD, and the gate GE, the source SE, and the drain DE of the active element T are exposed. The material of the protective layer PL may include an inorganic insulating material such as metal oxide, silicon oxide, or silicon nitride, but the disclosure is not limited thereto.

Next, a conductive layer CL is formed on the first electrode E1 and the drain DE and on the protective layer PL in the gap GP, so that the first type semiconductor pattern 121 of the light-emitting element LD is electrically connected to the drain DE through the first electrode E1 and the conductive layer CL, thereby completing the mutually electrically connected light-emitting element LD and active element T.

Figure 10:
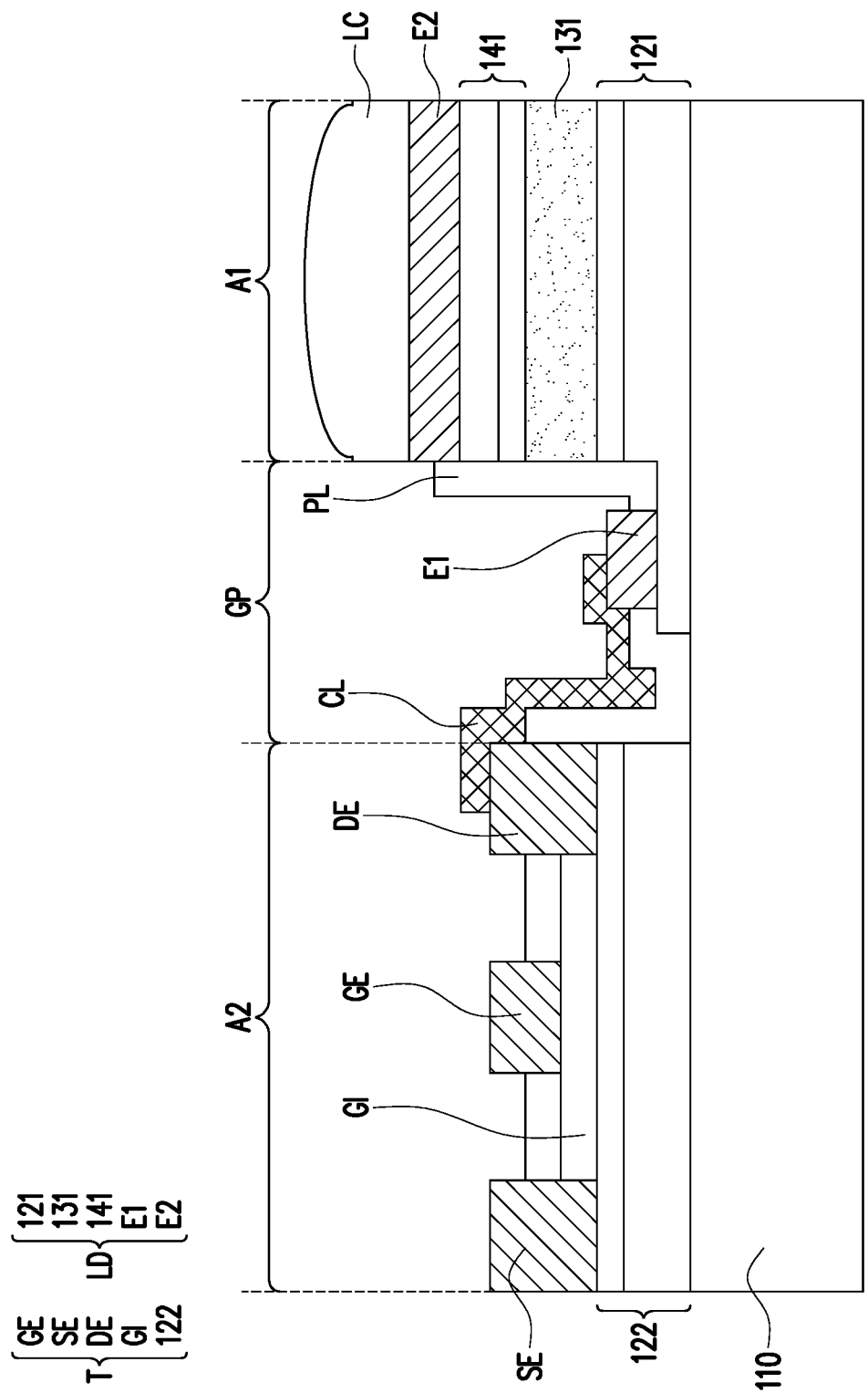

Next, please refer to FIG. 10. In some embodiments, a light-collimating structure LC may also be formed on the light-emitting element LD, so that the light emitted by the light-emitting element LD is more collimated and focused, thereby improving the subsequent light utilization efficiency. The light-collimating structure LC may be, for example, a collimated lens.

Figure 11:
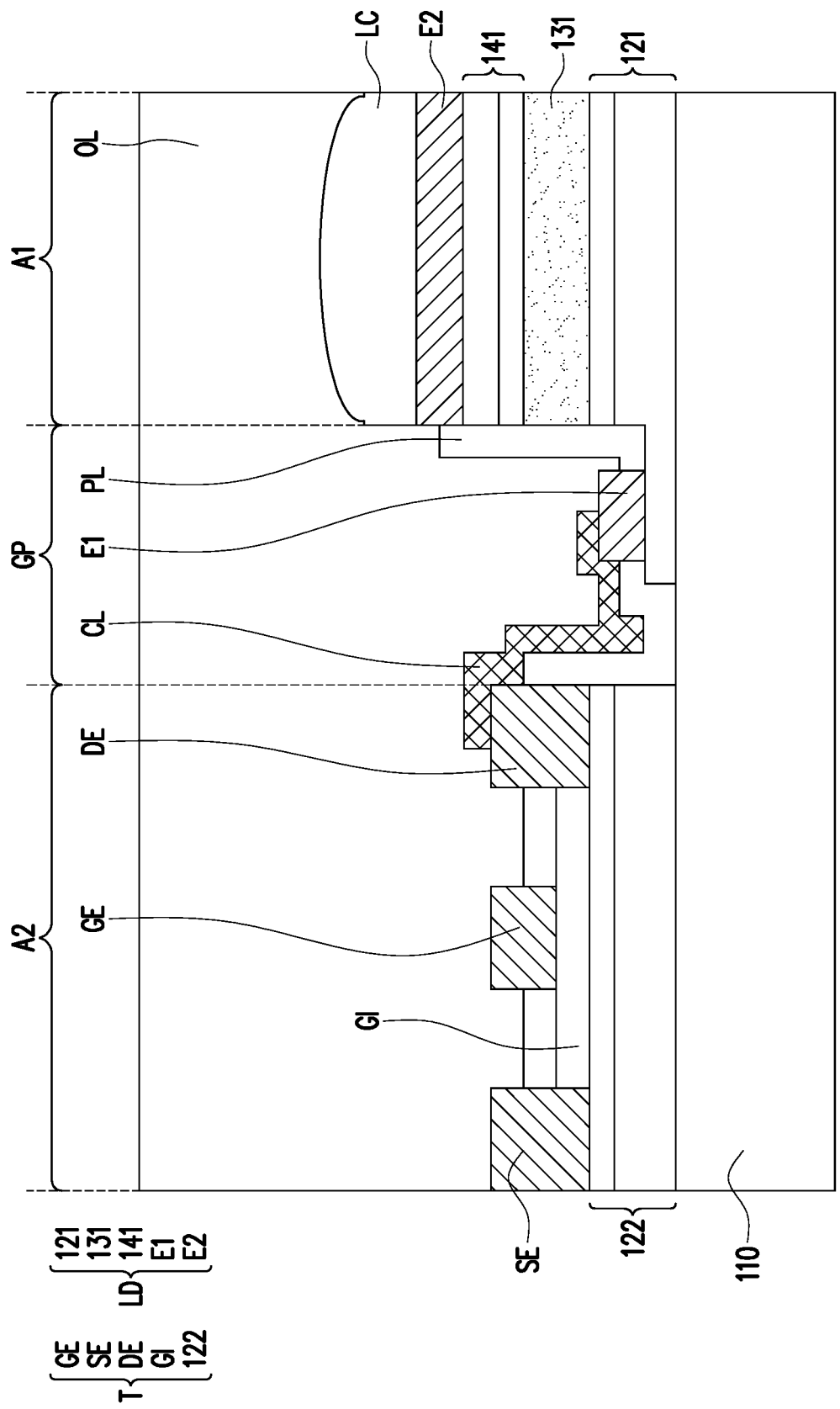

Next, please refer to FIG. 11. An optical layer OL is formed on the substrate 110, so that the optical layer OL covers the light-emitting element LD and the active element T. The optical layer OL may have properties similar to a light guide plate or light guide glass to facilitate total reflection. In some embodiments, the optical layer OL may be formed by coating and photocuring or thermal curing, so that the light-emitting element LD and the active element T are embedded in the optical layer OL. In some embodiments, the material of the optical layer OL may include a high refractive index colloidal material, such as acrylic polymer. When the refractive index of the optical layer OL is higher, the field of view may be increased and the degree of dispersion may be reduced, thereby improving the image quality. In some embodiments, the refractive index of the optical layer OL may not be less than 1.7. For example, the optical layer OL may have a refractive index of about 1.7 to 2.1. In some embodiments, the refractive index of the light-collimating structure LC is greater than the refractive index of the optical layer OL.

Figure 12:
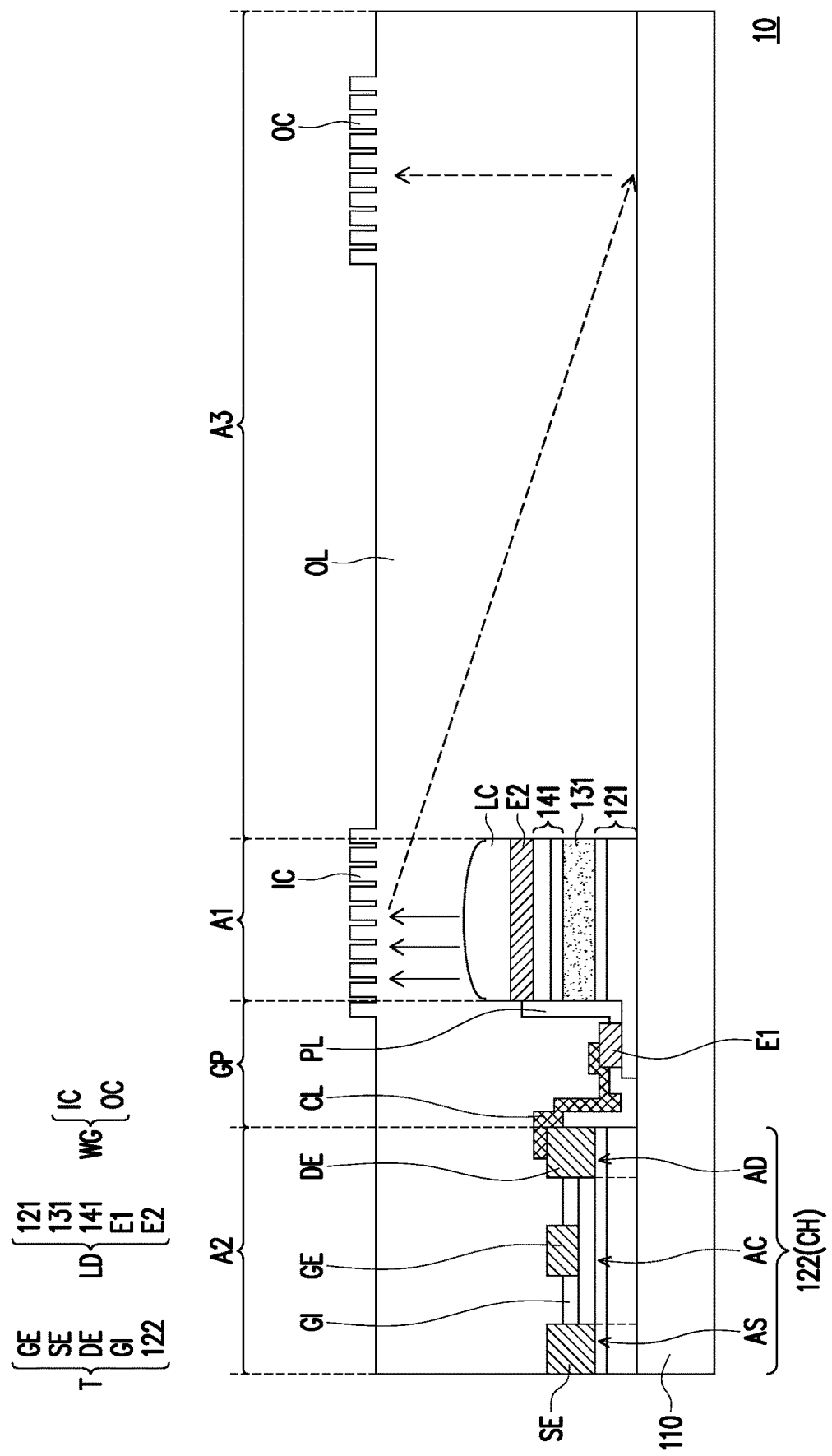

Next, please refer to FIG. 12. The substrate 110 may also include a transmission area A3 thereon, and the optical layer OL may extend from the active element area A2, the gap GP, and the light-emitting element area A1 to the transmission area A3. In this embodiment, a light guide structure WG may be formed on the optical layer OL, wherein the light guide structure WG includes an in-coupling portion IC and an out-coupling portion OC, the in-coupling portion IC is overlapped with the light-emitting element LD, and the out-coupling portion OC is located in the transmission area A3. In this embodiment, the light guide structure WG may be formed by nanoimprinting. For example, after coating the material of the optical layer OL, the light guide structure WG embedded in the optical layer OL may be obtained first by being imprinted using a mold and then by curing. Therefore, the material of the light guide structure WG may be the same as the material of the optical layer OL. In some embodiments, the light guide structure WG may be a grating, such as a surface relief grating, disposed on the surface of the optical layer OL. In this case, the material of the light guide structure WG may be different from the material of the optical layer OL. In some embodiments, the refractive index of the light guide structure WG may be greater than the refractive index of the optical layer OL. In this way, it is not necessary to align the light-emitting element LD with the in-coupling portion IC, and the transmission distance of the image of the light-emitting element LD to an out-coupling area AO can also be shortened.

FIG. 12 is a partial cross-sectional schematic diagram of a near-eye display device 10 according to an embodiment of the disclosure. The near-eye display device 10 includes the substrate 110, the light-emitting element LD, the active element T, the optical layer OL, and the light guide structure WG. In addition to the aforementioned sapphire substrate, after appropriate change of the substrate, the substrate 110 may also be a flexible substrate or a non-flexible substrate with suitable materials, such as a quartz substrate, a glass substrate, or a polymer substrate.

The light-emitting element LD is located in the light-emitting element area A1 of the substrate 110 and includes the first type semiconductor pattern 121, the light-emitting pattern 131, the second type semiconductor pattern 141, the first electrode E1, and the second electrode E2. The light-emitting pattern 131 is located between the first type semiconductor pattern 121 and the second type semiconductor pattern 141, the first electrode E1 is electrically connected to the first type semiconductor pattern 121, and the second electrode E2 is electrically connected to the second type semiconductor pattern 141.

The active element T is located in the active element area A2 of the substrate 110. The active element T is located adjacent to the light-emitting element LD, and the active element area A2 and the light-emitting element area A1 are separated by the gap GP. The active element T may include the gate GE, the source SE, the drain DE, the gate insulating layer GI, and the first type semiconductor pattern 122, and the first type semiconductor pattern 122 may serve as the channel layer CH of the active element T. The gate insulating layer GI is located between the gate GE and the first type semiconductor pattern 122. The source SE is electrically connected to the source area AS of the first type semiconductor pattern 122, and the drain DE is electrically connected to the drain area AD of the first type semiconductor pattern 122. In this embodiment, the channel layer CH of the active element T and the first type semiconductor pattern 121 of the light-emitting element LD belong to the same layer, and the first electrode E1 of the light-emitting element LD is electrically connected to the drain DE of the active element T through the conductive layer CL. In this way, by integrating and embedding the light-emitting element LD and the active element T in the optical layer OL, the optical loss can be reduced.

The optical layer OL covers the light-emitting element LD and the active element T. The light guide structure WG is disposed on the optical layer OL and includes the in-coupling portion IC and the out-coupling portion OC, wherein the in-coupling portion IC is overlapped with the light-emitting element LD. In this way, the light emitted by the light-emitting element LD may enter the optical layer OL from the in-coupling portion IC, travel in the optical layer OL to the out-coupling portion OC by total reflection, and then leave the near-eye display device 10 from the out-coupling portion OC.

In some embodiments, the near-eye display device 10 further includes the light-collimating structure LC. The light-collimating structure LC may be located between the light-emitting element LD and the optical layer OL, and the light-collimating structure LC may be overlapped with the in-coupling portion IC of the light guide structure WG. The light-collimating structure LC may enable the light emitted by the light-emitting element LD to be more collimated and focused, thereby improving the light utilization efficiency of the light-emitting element LD.

FIGS. 13 to 16 are partial cross-sectional schematic diagrams of a step-by-step process of a manufacturing method of a near-eye display device 20 according to an embodiment of the disclosure. It should be noted that the embodiment of FIGS. 13 to 16 happens following the steps of FIG. 4 and that the embodiment of FIGS. 13 to 16 continues to use the reference numerals and some content of the embodiments of FIGS. 1 to 12, wherein the same or similar reference numerals are used to represent the same or similar elements, and the description of the same technical content is omitted. For the description of the omitted parts, please refer to the previous embodiments, which will not be repeated here.

Figure 13:
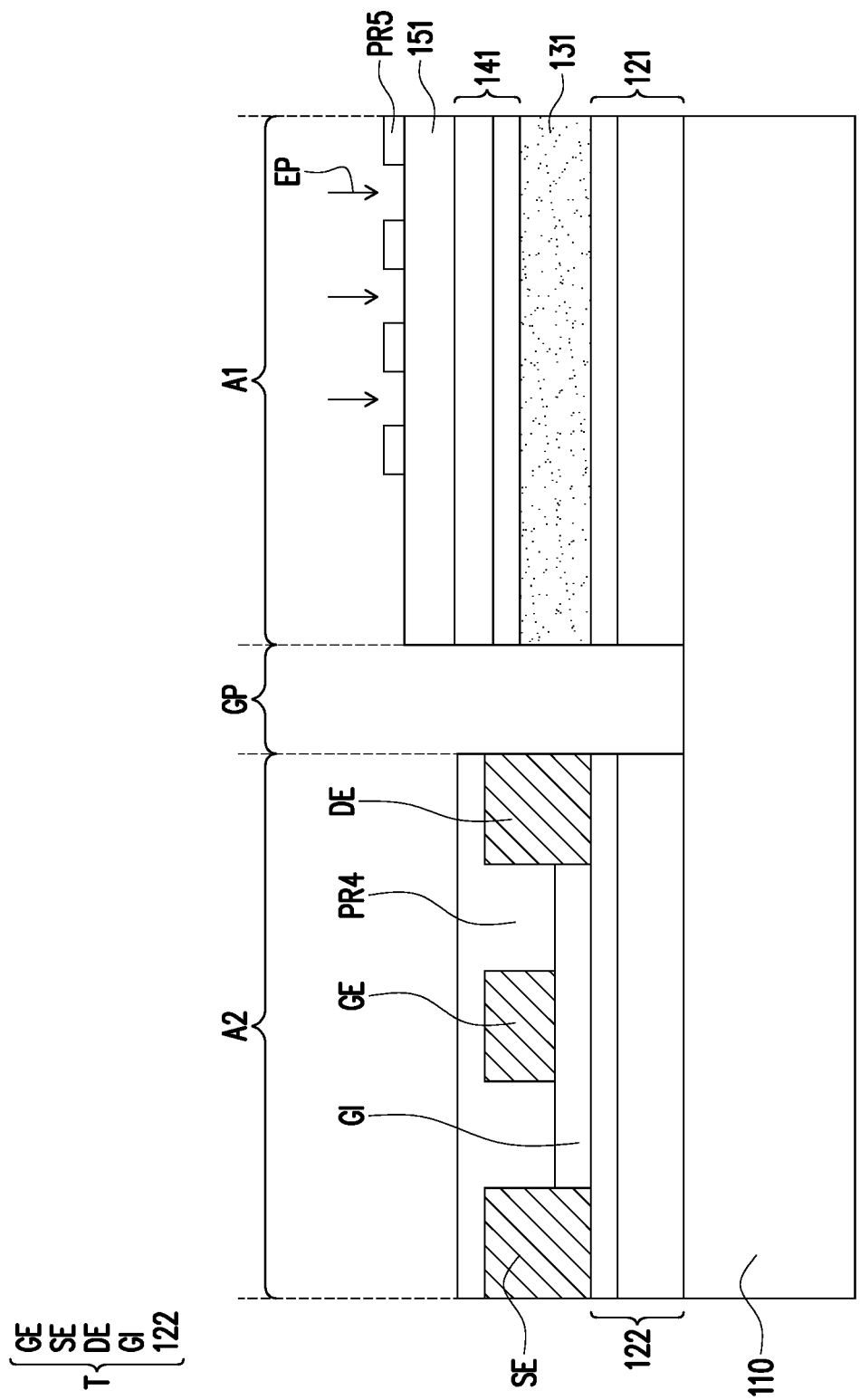
FIGS. 13 to 16 are partial cross-sectional schematic diagrams of a step-by-step process of a manufacturing method of a near-eye display device 20 according to an embodiment of the disclosure.
Figure 14:
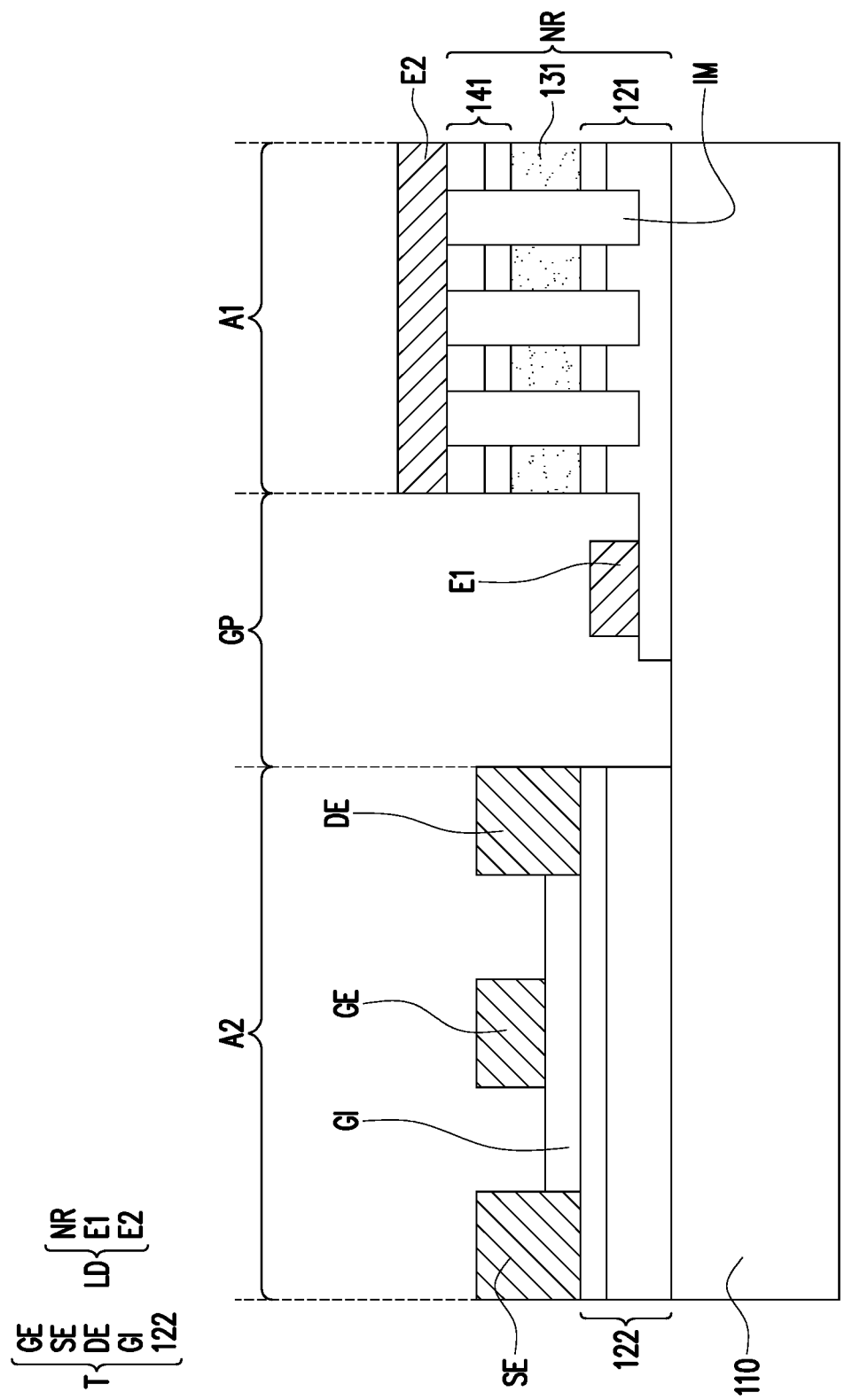

Please refer to FIGS. 13 and 14. After forming the active element T, the patterning process EP is performed on the first type semiconductor pattern 121, the light-emitting pattern 131, the second type semiconductor pattern 141, and the insulating pattern 151 located in the light-emitting element area A1 using a photoresist PR5 to form multiple nanorod structures NR of the light-emitting element LD, while protecting the active element T located in the active element area A2 using the photoresist PR4. Then, the photoresists PR4 and PR5 and the remaining insulating pattern 151 are removed. Each nanorod structure NR may include a part of the first type semiconductor pattern 121, a part of the light-emitting pattern 131, and a part of the second type semiconductor pattern 141. In some embodiments, a dry etching process may be used to remove the second type semiconductor pattern 141 and the light-emitting pattern 131 between the nanorod structures NR, and only remove a part of the first type semiconductor pattern 121, so that the first type semiconductor patterns 121 of the nanorod structures NR may remain connected, and a part of the first type semiconductor pattern 121 may be exposed. In some embodiments, an insulating material IM may be filled between the nanorod structures NR. The insulating material IM is, for example, polyimide or silicon oxide. In some embodiments, each light-emitting element LD may constitute a sub-pixel.

Next, the first electrode E1 may be formed on an exposed part of the first type semiconductor pattern 121, and the second electrode E2 may be formed on the nanorod structures NR and the insulating material IM, so that the first electrode E1 may be electrically connected to the first type semiconductor pattern 121, and the second electrode E2 may be electrically connected to the second type semiconductor pattern 141 of the nanorod structures NR, thereby completing the manufacturing of the light-emitting element LD. The light-emitting element LD may include the nanorod structures NR, the first electrode E1, and the second electrode E2.

Figure 15:
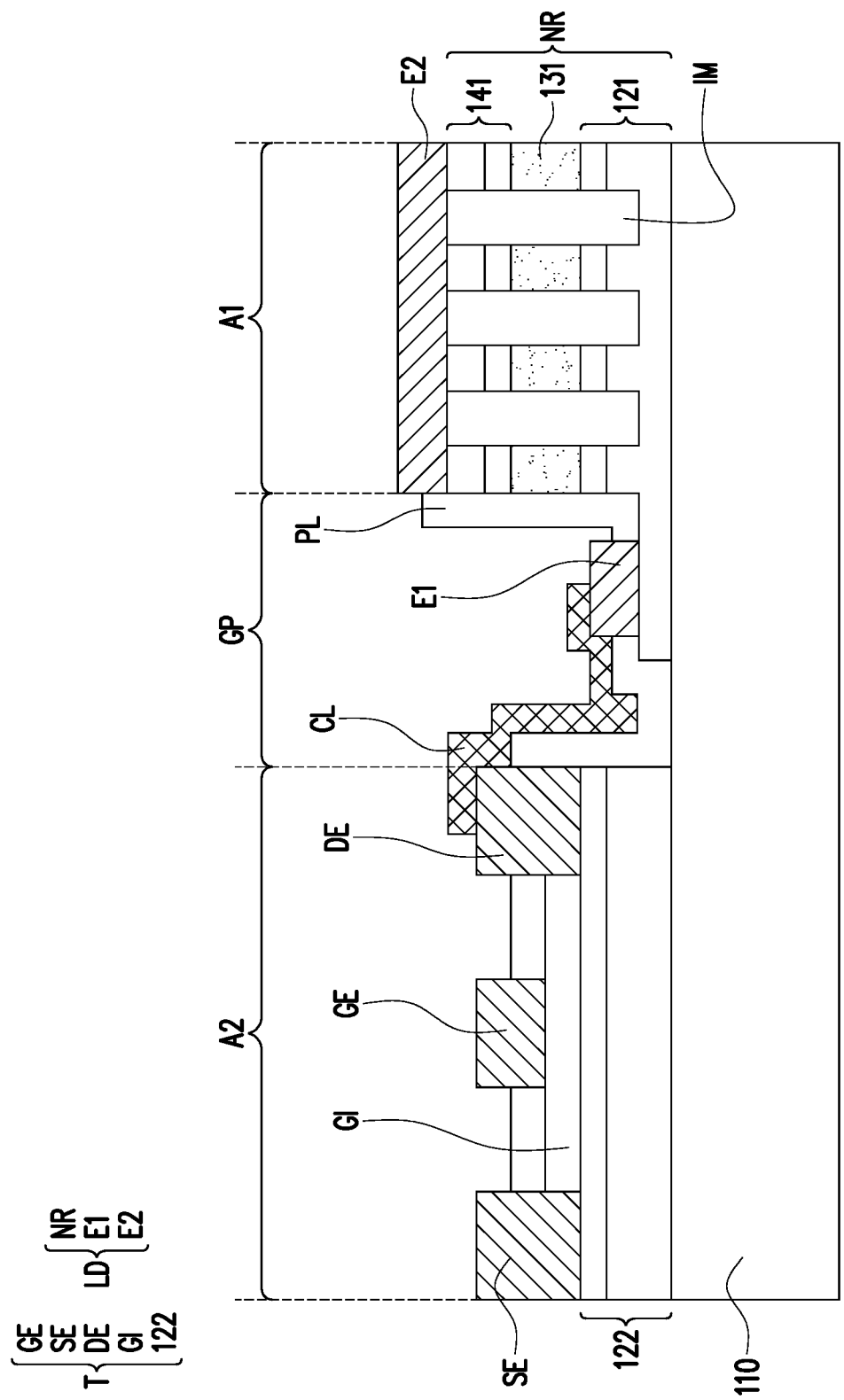

Next, please refer to FIG. 15. The protective layer PL is formed in the light-emitting element area A1, the active element area A2, and the gap GP. The first electrode E1 and the second electrode E2 of the light-emitting element LD and the gate GE, the source SE, and the drain DE of the active element T are exposed. Then, the conductive layer CL is formed on the first electrode E1 and the drain DE and on the protective layer PL in the gap GP, so that the first electrode E1 is electrically connected to the drain DE through the conductive layer CL. Next, please refer to FIG. 16. The substrate 110 may also include the transmission area A3 thereon, and the optical layer OL may extend from the active element area A2, the gap GP, and the light-emitting element area A1 to the transmission area A3. In this embodiment, the light guide structure WG may be formed on the optical layer OL, wherein the light guide structure WG includes the in-coupling portion IC and the out-coupling portion OC, the in-coupling portion IC is overlapped with the light-emitting element LD, and the out-coupling portion OC is located in the transmission area A3. In this embodiment, the light guide structure WG may be a grating, such as a surface relief grating, disposed on the surface of the optical layer OL. In this case, the material of the light guide structure WG may be different from the material of the optical layer OL. In some embodiments, the refractive index of the light guide structure WG may be greater than the refractive index of the optical layer OL.

Figure 16:
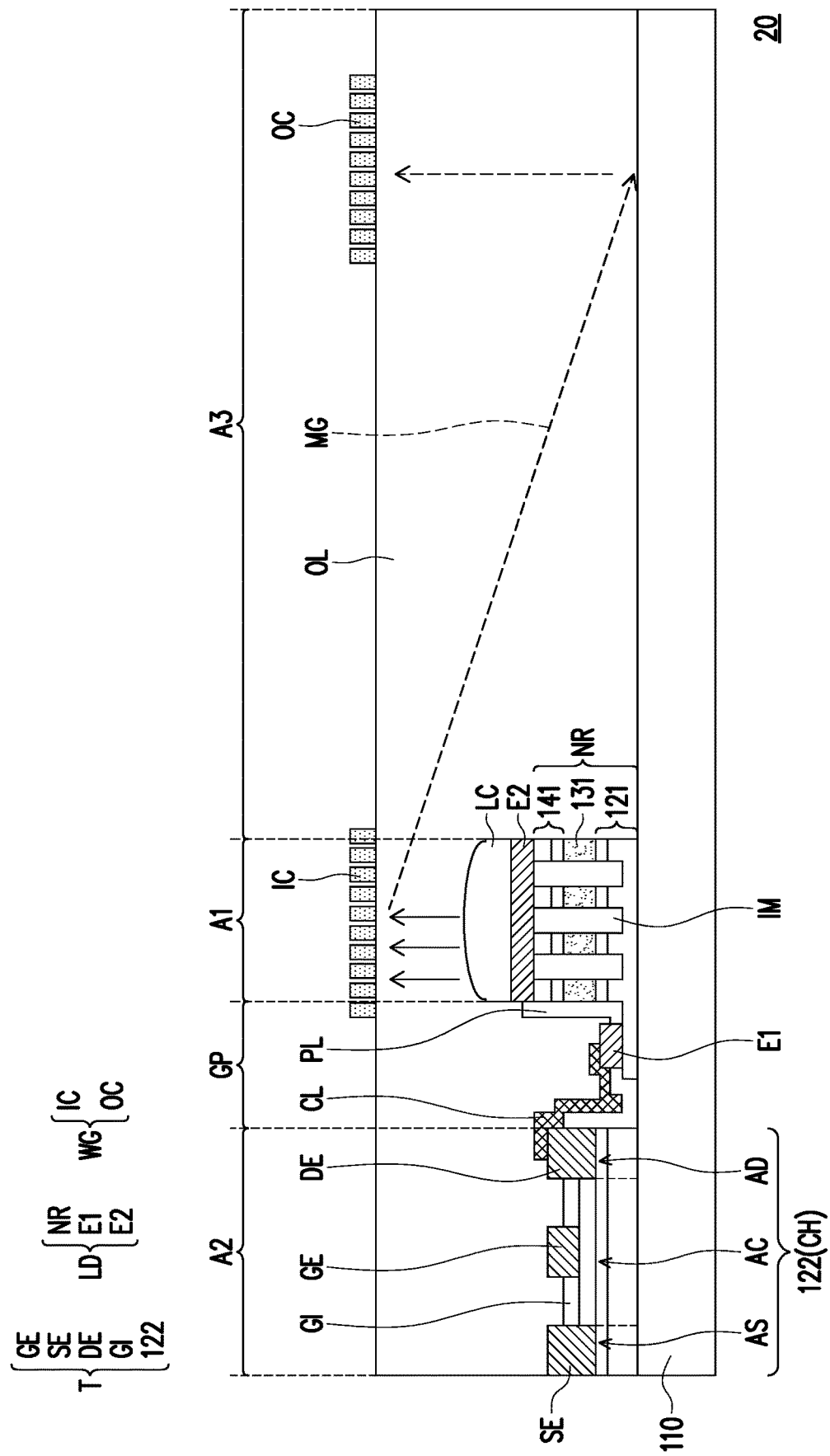

FIG. 16 is a partial cross-sectional schematic diagram of a near-eye display device 20 according to an embodiment of the disclosure. The near-eye display device 20 includes the substrate 110, the light-emitting element LD, the active element T, the optical layer OL, and the light guide structure WG. In addition to the aforementioned sapphire substrate, after appropriate change of the substrate, the substrate 110 may also be a flexible substrate or a non-flexible substrate with suitable materials, such as a quartz substrate, a glass substrate, or a polymer substrate.

The light-emitting element LD is located in the light-emitting element area A1 of the substrate 110 and includes the first type semiconductor pattern 121, the light-emitting pattern 131, the second type semiconductor pattern 141, the first electrode E1, and the second electrode E2.

The light-emitting pattern 131 is located between the first type semiconductor pattern 121 and the second type semiconductor pattern 141, the first electrode E1 is electrically connected to the first type semiconductor pattern 121, and the second electrode E2 is electrically connected to the second type semiconductor pattern 141. In some embodiments, the light-emitting element LD may also include multiple nanorod structures NR. Each nanorod structure NR may include a part of the first type semiconductor pattern 121, a part of the light-emitting pattern 131, and a part of the second type semiconductor pattern 141, and the nanorod structures NR may be separated by the insulating material IM.

The active element T is located in the active element area A2 of the substrate 110. The active element T is located adjacent to the light-emitting element LD, and the active element area A2 and the light-emitting element area A1 are separated by the gap GP. The active element T may include the gate GE, the source SE, the drain DE, the gate insulating layer GI, and the first type semiconductor pattern 122, and the first type semiconductor pattern 122 may serve as the channel layer CH of the active element T. The gate insulating layer GI is located between the gate GE and the first type semiconductor pattern 122, the source SE is electrically connected to the source area AS of the first type semiconductor pattern 122, and the drain DE is electrically connected to the drain area AD of the first type semiconductor pattern 122. In this embodiment, the channel layer CH of the active element T and the first type semiconductor pattern 121 of the light-emitting element LD belong to the same layer.

The optical layer OL covers the light-emitting element LD and the active element T. The light guide structure WG is located on the optical layer OL and includes the in-coupling portion IC and the out-coupling portion OC, wherein the in-coupling portion IC is overlapped with the light-emitting element LD. In this way, an image MG provided by the light-emitting element LD may enter the optical layer OL from the in-coupling portion IC. Then, the optical layer OL may guide the image MG to the out-coupling portion OC by total reflection. The image MG then leaves the optical layer OL from the out-coupling portion OC.

In some embodiments, the near-eye display device 20 further includes the light-collimating structure LC. The light-collimating structure LC may be located between the light-emitting element LD and the optical layer OL, and the light-collimating structure LC may be overlapped with the in-coupling portion IC of the light guide structure WG.

Figure 17A:
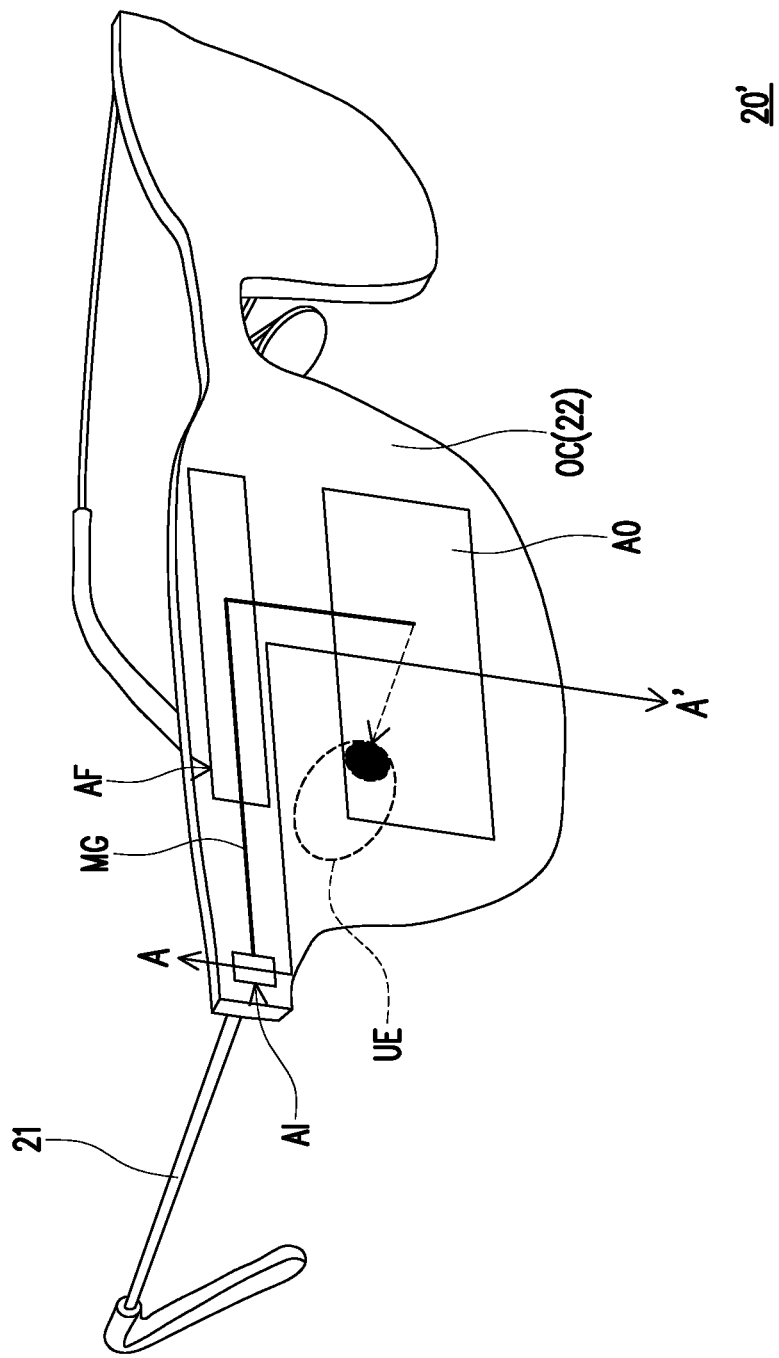
FIG. 17A is a three-dimensional schematic diagram of a near-eye display device 20' according to an embodiment of the disclosure.
Figure 17B:
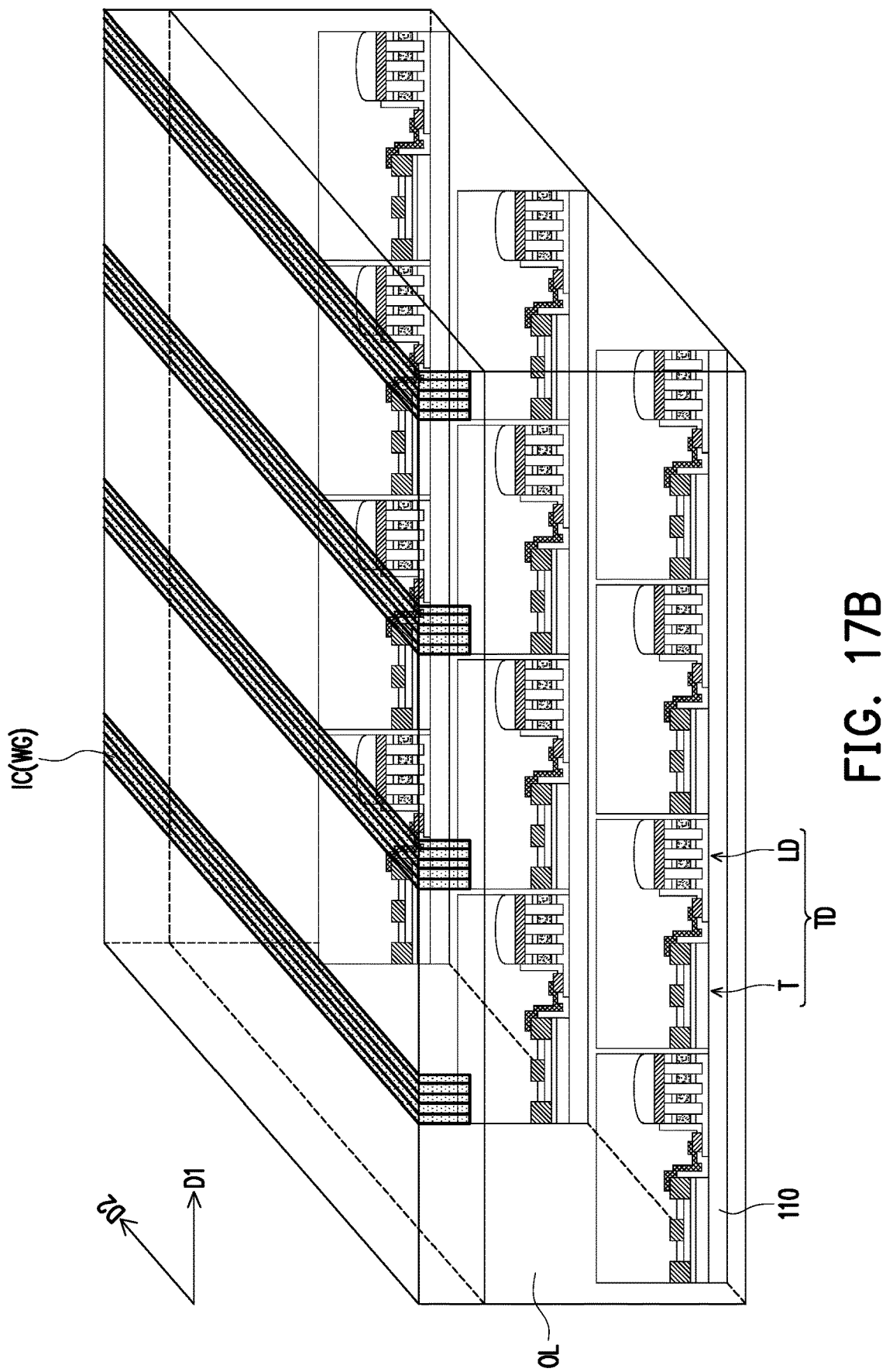
FIG. 17B is a partially enlarged three-dimensional schematic diagram of an in-coupling area AI in FIG. 17A.

FIG. 17A is a three-dimensional schematic diagram of a near-eye display device 20' according to an embodiment of the disclosure. FIG. 17B is a partially enlarged three-dimensional schematic diagram of the in-coupling area AI in FIG. 17A. In addition, FIG. 16 may be a cross-sectional schematic diagram taken along a cross-sectional line A-A' of FIG. 17A. The embodiment of FIGS. 17A and 17B continues to use the reference numerals and some content of the embodiments of FIGS. 13 to 16, wherein the same or similar reference numerals are used to represent the same or similar elements, and the description of the same technical content is omitted. For the description of the omitted parts, please refer to the previous embodiments, which will not be repeated here.

Please refer to FIG. 17A. In this embodiment, the near-eye display device 20' may be a spectacle-type near-eye display, and the near-eye display device 20' may include a frame 21 and a lens 22. The near-eye display device 20 may be disposed on the lens 22. For example, the main body of the lens 22 may be composed of the optical layer OL of the near-eye display device 20, and the lens 22 may have the in-coupling area AI, the out-coupling area AO, and a flyeye area AF. The image MG from the in-coupling area AI may be expanded in the flyeye area AF, then forwarded to the out-coupling area AO, leaves the near-eye display device 20' from the out-coupling area AO, and then enters the user's eye UE.

Please refer to FIG. 17B. In this embodiment, multiple combinations TD of the active elements T and the light-emitting elements LD may be disposed in the in-coupling area AI of the near-eye display device 20'. The combinations TD of the active elements T and the light-emitting elements LD may be embedded in the optical layer OL, and the combinations TD may be arranged in an array on the substrate 110. In other words, the combinations TD may be arranged at equal intervals along a direction D1 and the combinations TD may also be arranged at equal intervals along a direction D2. The interval along the direction D1 may be the same as or different from the interval along the direction D2.

In addition, the in-coupling portion IC of the light guide structure WG may be embedded in the optical layer OL and the in-coupling portion IC may be disposed on the light-emitting element LD. The orthogonal projection of the in-coupling portion on the substrate 111 is at least partially overlapped with the orthogonal projection of the light-emitting element LD on the substrate 111. In this way, each light-emitting element LD may serve as one sub-pixel of the near-eye display device 20', so that the light-emitting elements LD can provide the image MG.

In summary, the near-eye display device of the disclosure can reduce light loss by integrating and embedding the light-emitting element and the active element in the optical layer. Additionally, the manufacturing method of the near-eye display device of the disclosure can reduce the difficulty of assembly by integrating and embedding the light-emitting element and the active element in the optical layer.

Although the disclosure has been disclosed in the above embodiments, the embodiments are not intended to limit the disclosure. Persons skilled in the art may make some changes and modifications without departing from the spirit and scope of the disclosure. Therefore, the protection scope of the disclosure shall be defined by the appended claims.

What is claimed is:
1. A near-eye display device, comprising:
 a substrate;
 a light-emitting element, located on the substrate and comprising a first type semiconductor pattern;
 an active element, located adjacent to the light-emitting element, and a channel layer of the active element and the first type semiconductor pattern of the light-emitting element belonging to a same layer;

an optical layer, covering the light-emitting element and the active element; and a light guide structure, located on the optical layer and comprising an in-coupling portion and an out-coupling portion, wherein the in-coupling portion is overlapped with the light-emitting element.

2. The near-eye display device of claim 1, wherein the first type semiconductor pattern of the light-emitting element is electrically connected to a drain of the active element.

3. The near-eye display device of claim 1, wherein a refractive index of the light guide structure is greater than a refractive index of the optical layer.

4. The near-eye display device of claim 1, wherein the light-emitting element comprises a plurality of nanorod structures.

5. The near-eye display device of claim 1, wherein a material of the light guide structure is the same as a material of the optical layer.

6. The near-eye display device of claim 1, wherein a material of the light guide structure is different from a material of the optical layer.

7. The near-eye display device of claim 1, further comprising a light-collimating structure located between the light-emitting element and the optical layer, and overlapped with the in-coupling portion.

8. The near-eye display device of claim 7, wherein a refractive index of the light-collimating structure is greater than a refractive index of the optical layer.

9. The near-eye display device of claim 1, wherein a refractive index of the optical layer is not less than 1.7.

10. The near-eye display device of claim 1, wherein the near-eye display device is disposed on a spectacle lens.

11. A manufacturing method of a near-eye display device, comprising:

forming a light-emitting element and an active element on a substrate, wherein a first electrode of the light-emitting element is electrically connected to a drain of the active element;

forming an optical layer on the substrate, wherein the optical layer covers the light-emitting element and the active element; and forming a light guide structure on the optical layer, wherein the light guide structure comprises an in-coupling portion and an out-coupling portion, and the in-coupling portion is overlapped with the light-emitting element.

12. The manufacturing method of the near-eye display device of claim 11, wherein the light guide structure is formed by nanoimprinting.

13. The manufacturing method of the near-eye display device of claim 11, further comprising forming a light-collimating structure on the light-emitting element before forming the optical layer.

14. The manufacturing method of the near-eye display device of claim 11, wherein forming the light-emitting element and the active element on the substrate comprises:

forming a first type semiconductor layer, a light-emitting layer, and a second type semiconductor layer on the substrate;

patterning the second type semiconductor layer, the light-emitting layer, and the first type semiconductor layer to form a second type semiconductor pattern, a light-emitting pattern, and a first type semiconductor pattern located in a light-emitting element area and a channel layer located in an active element area, wherein the channel layer and the first type semiconductor pattern belong to a same layer, and there is a gap between the light-emitting element area and the active element area;

forming a gate insulating layer of the active element on the channel layer, wherein the gate insulating layer partially covers the channel layer;

forming a gate, a source, and a drain of the active element, wherein the gate is located on the gate insulating layer, and the source and the drain are respectively located at both sides of the gate insulating layer and electrically connected to the channel layer;

forming a first electrode and a second electrode of the light-emitting element in the light-emitting element area, wherein the first electrode is electrically connected to the first type semiconductor pattern and the second electrode is electrically connected to the second type semiconductor pattern; and forming a conductive layer, wherein the conductive layer passes through the gap and electrically connects the first electrode and the drain.

15. The manufacturing method of the near-eye display device of claim 14, wherein patterning the second type semiconductor layer, the light-emitting layer, and the first type semiconductor layer comprises:

removing the second type semiconductor layer and the light-emitting layer located in the active element area and the gap; and removing the first type semiconductor layer located in the gap.

* * * * *